Jan. 29, 1924.

J. H. FELTHOUSEN 1,482,292

TURBINE

Filed July 25, 1917

Witness
Chas. S. Hyer.

Inventor
John H. Felthousen
By James L. Norris,
Attorney

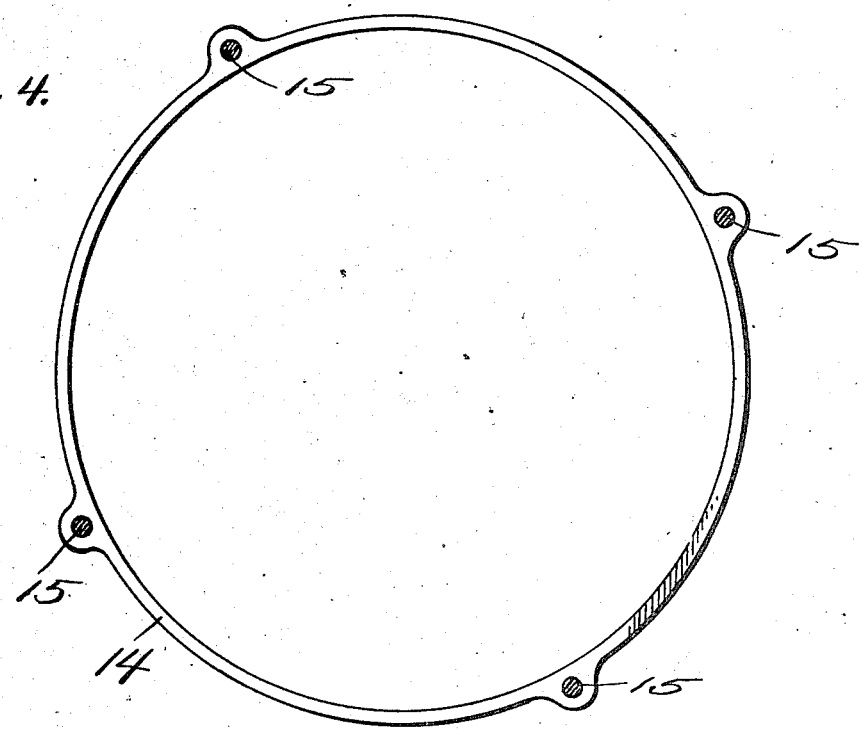
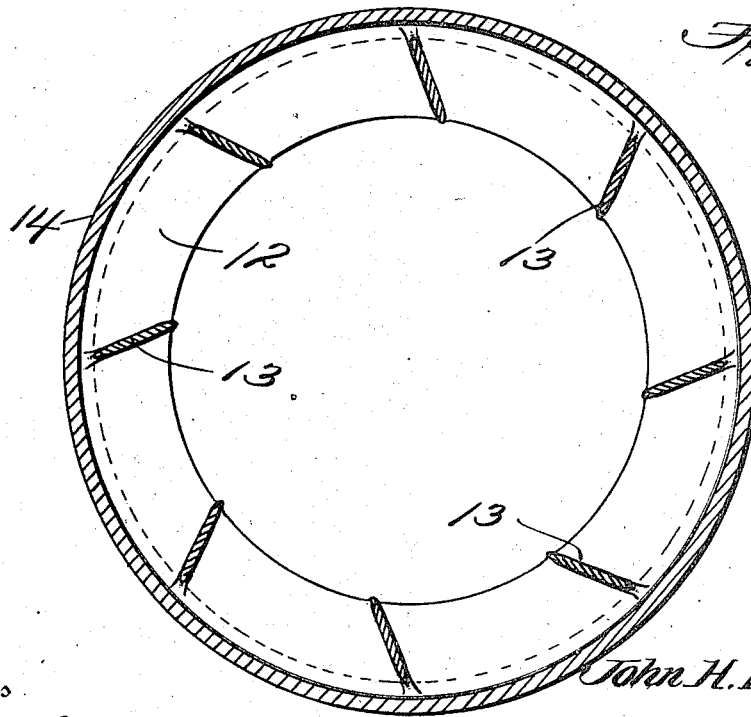

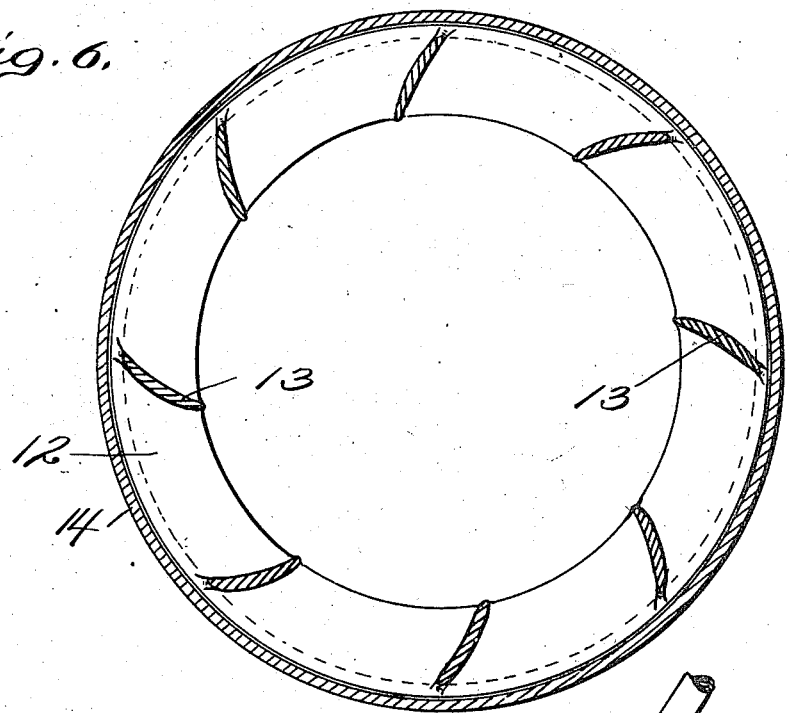
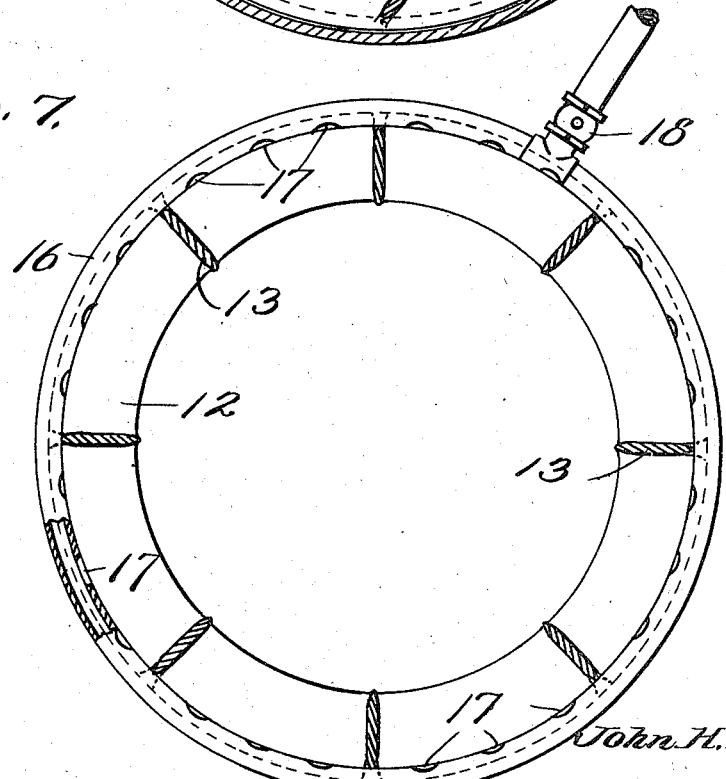

Patented Jan. 29, 1924.

1,482,292

UNITED STATES PATENT OFFICE.

JOHN H. FELTHOUSEN, OF YORK, PENNSYLVANIA, ASSIGNOR TO S. MORGAN SMITH COMPANY, OF YORK, PENNSYLVANIA, A CORPORATION OF PENNSYLVANIA.

TURBINE.

Application filed July 25, 1917. Serial No. 182,793.

*To all whom it may concern:*

Be it known that I, JOHN H. FELTHOUSEN, a citizen of the United States, residing at York, in the county of York and State of Pennsylvania, have invented new and useful Improvements in Turbines, of which the following is a specification.

This invention relates to turbines, and particularly to means for modifying the water head on turbines, and the main objects of the invention are to augment the suction directly in the ordinary form of draft tube or water discharge means to such a degree as to materially increase a given water head on a turbine and correspondingly increase the speed and power of the turbine, and also to so regulate the suction or water pull in the draft tube or discharge means relatively to the water head as to render the turbine power generating means easily controllable to compensate for or obviate the disadvantages incident to diminution of speed or power due to fall or loss of head during high water, or, from any other cause. The increased suction in the draft tube or discharge means is effected by admitting water thereinto from the exterior of the tube or discharge means in regulable quantities at the most advantageous point, the water being supplied from any external source, such as a pen stock, or it may be piped to the point of injection or inlet into the draft tube or discharge means without detracting from the structural contour and efficiency of the usual form of draft tube or water discharge or outlet means, or in any manner modifying the installation of turbine organizations as made and used at the present time.

Heretofore, means have been provided for increasing the suction and pull in draft tube or delivery outlets of turbines to increase the head, but generally such means have required separate or supplementary tubes to create a water flow parallel with or at an angle to or across the flow direct from the turbine draft tube, and in some cases such arrangements have required internal working valve means which, of course, is objectionable in a draft tube, while the present invention does not require supplemental tubes or internal working valves, but simply consists of an ordinary draft tube from the wheel, fitted with external means of supplying water flow to the inside of the draft tube for the purpose referred to above.

An embodiment of the invention is disclosed in the accompanying drawings and will be hereinafter particularly described solely for the purpose of demonstration of one practical organization involving the inventive features and which will produce the result sought.

In the drawings:—

Figure 4 is a top plan view of one form of valve means to cooperate with the draft tube ring.

Figure 5 is a view similar to Figure 2 showing a modification.

Figure 6 is a view similar to Figures 2 and 5 showing a further modification.

Figure 7 is a top plan view of the draft tube ring showing a still further modification.

Figure 1:
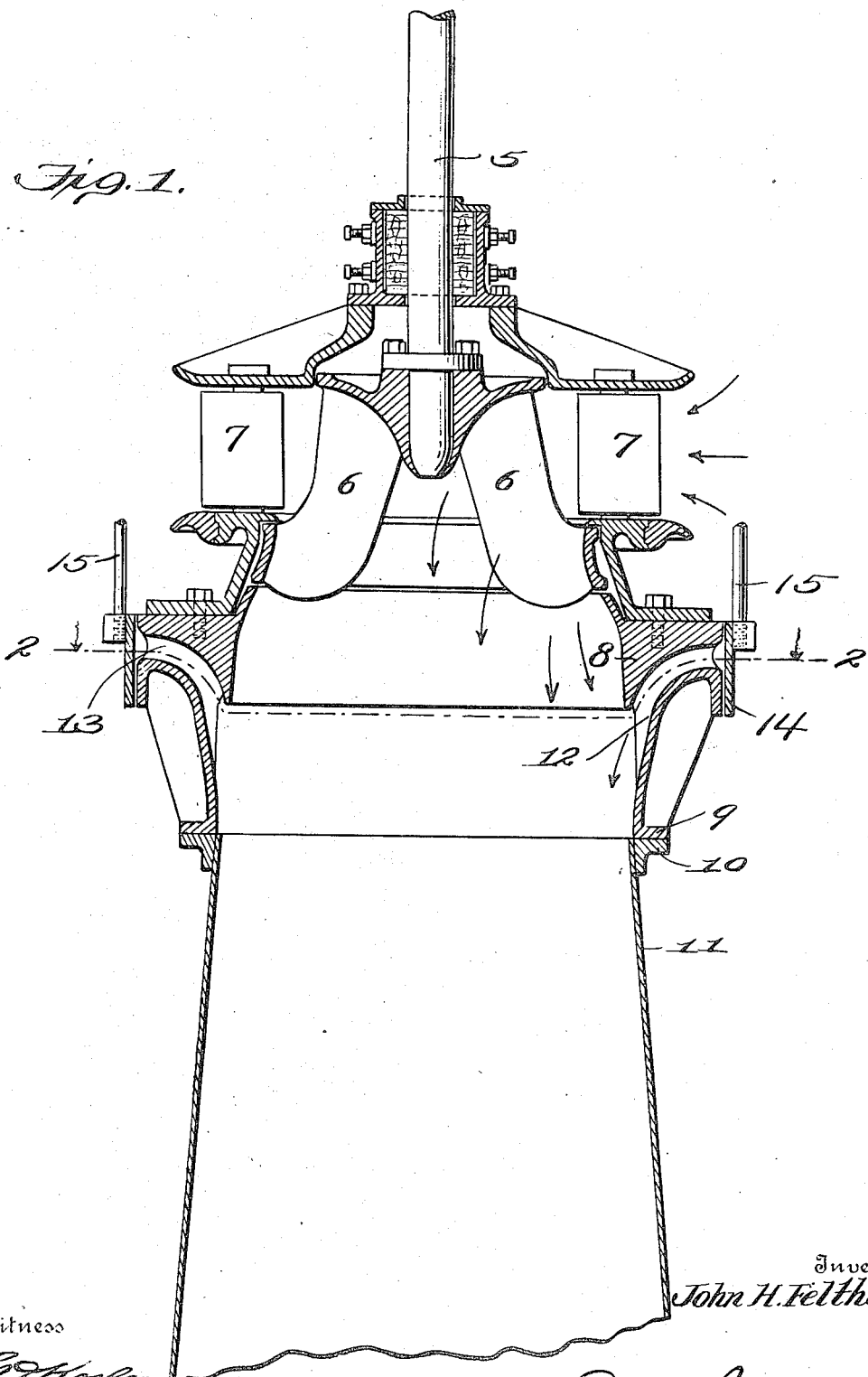
Figure 1 is a transverse vertical section, through parts, of a turbine embodying the features of the invention, portions of the turbine being broken away.

The numeral 5 designates the shaft, 6 the runner, and 7 the gates of a turbine, all constructed and arranged as well known and forming no part of the present invention. The turbine also has the usual enclosure members or castings and includes a draft tube ring 8 with a lower flange 9 suitably secured to the flange 10 of the draft tube 11 mounted as shown.

Figure 2:
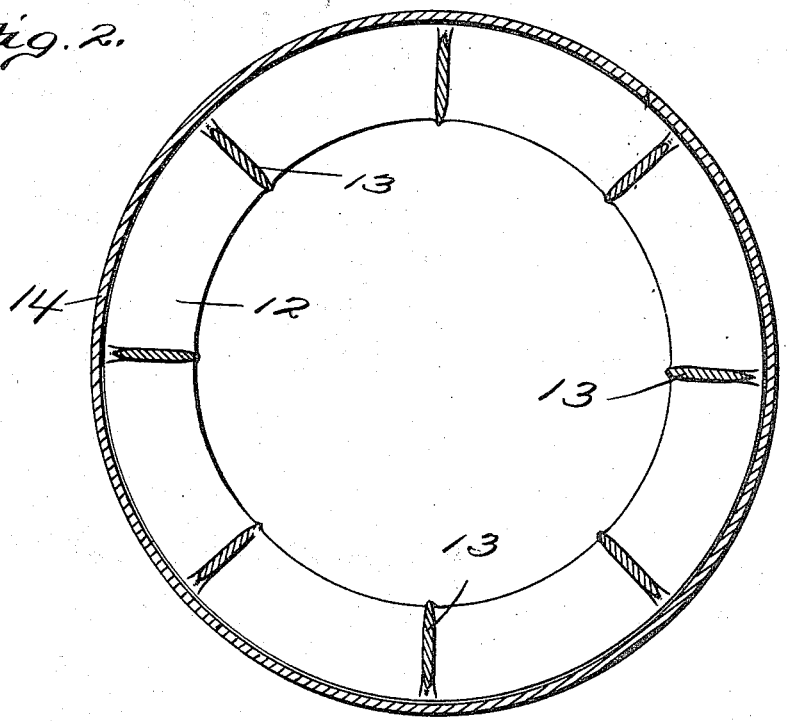
Figure 2 is an enlarged section taken in the plane of the line 2—2, Figure 1, through the draft tube ring.
Figure 3:
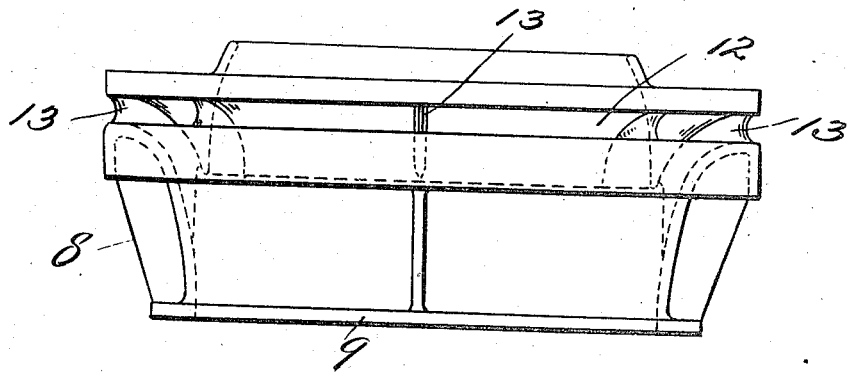
Figure 3 is a detail side elevation of the draft tube ring.

The water inlet for the draft tube or delivery means as illustrated in the drawings is located in the draft tube ring 8 and is in the form of a space 12 open at the outer and inner terminals or extends entirely through the wall of said ring. This inlet or space 12 inclines downwardly and inwardly from the outer to the inner side of the ring 8 and is transversely divided at intervals by ribs or partitions 13 which may be radial as shown by Figure 2, or inclined either forwardly or rearwardly and either straight or curved, as shown by Figures 6 and 7. These ribs or partitions 13 are rounded at their outer and inner ends and taper towards their inner ends, the ends of the ribs or partitions being slightly inside of the planes of the outer and inner surfaces of the wall of the ring 8 to provide a practical clearance and to avoid the least obstructions to the free inlet and outlet of the water supplied to the inlet. This water inlet may be placed at any point between the runner and outlet of the draft tube as various turbine operating conditions may require, but for general practical results the position thereof shown by the drawings will be found to be efficient. This inlet may be varied in shape and size, but the inner outlet thereof should be so positioned as to cause the water entering the draft tube therethrough to take the direction of the water discharged from the runner to avoid interfering with said discharge water and also to more effectively act through the latter to increase the suction in the draft tube and the head on the turbine. It is known that, under some conditions of discharge from the runner, the water revolves in a direction opposite to the direction of movement of the runner and, under other conditions, this discharge water follows the runner or moves in the same direction as the said runner, and the modifications in position of the ribs or partitions 13 as shown by Figures 5 and 6 are intended to render the improvements efficient under all conditions of movement of the discharge water.

Valve means to regulate and control the admission of the water through the inlet 12 is provided, and one form is shown as a sliding cylinder gate 14 closely engaging the outer side of the draft tube ring 8 and having adjusting rods 15 operable at any point above or distant from the turbine by suitable mechanical devices to shift the cylinder to uncover more or less of the inlet 12 as may be desired, or, to entirely cut off the supply of water through the inlet. This valve means may be of any form located and operable exteriorly of the draft tube ring and draft tube to regulate the extraneous supply of water to the draft tube without in the least interfering with the function of said tube and preferably without requiring a special construction of the tube to adapt the improvements thereto. As shown by Figure 7, the water may be supplied by a pipe 16 closely fitted around the draft tube ring in the outer terminal of the inlet 12 and having outlets 17 to permit the free flow of the water into the said inlet. The pipe 16 may connect with a source of supply at any distance from the turbine and is provided with valve means 18 to regulate the flow of water therethrough to the inlet. This modification illustrates the practicability of the invention with a pipe or conduit confined water supply and a different valve means, and is intended to show that the invention is not confined to precise structural features to accomplish the function sought.

The efficiency of the present invention is due largely to the manner of admitting the water into the draft tube or discharge means beyond the runner and to provide said water-admission means or inlet with controlling valve means wholly located and operable exteriorly of the draft tube or discharge conduit and thereby avoid the necessity of specially constructing the draft tube or discharge conduit or interfering with the interior thereof to adapt the invention thereto. Hence, a draft tube or discharge conduit of usual construction may be used with the invention applied thereto with material advantages in the construction and cost of installation of turbine organizations.

The improved construction herein disclosed and comprising the inlet 12, which serves as a head increaser under certain operative conditions hereinbefore specified, has a further advantage in that the said inlet is continually open from its inner to its outer terminations, and by locating the valve means exteriorly of the inlet, or to operate the said valve outside instead of interiorly at the inner termination of the inlet adjacent to the point where the latter communicates with the draft tube, the inlet is free of water when the valve is closed and there is no weight pressure of a volume of water within the inlet on the turbine structure as a whole above the draft tube, and is thus materially distinguished from those head increaser structures where the valve or closure means for the inlet is located at the inner termination or adjacent to the point of communication of the inlet with the draft tube. Moreover, by locating the valve means exteriorly of the inlet, the pressure of water is against the outer side of the valve means where the ring valve or cylinder is used when the latter is closed. Moreover, the ring valve or cylinder when closed is braced against the outer draft tube ring or turbine structure and leakage of water through the closed valve is less liable to occur and entrance of water into the inlet and draft tube, at times undesirable, is prevented. When the valve is located at the inner termination of an auxiliary inlet, or where the latter opens into the draft tube or interior of the turbine structure, the inlet from the interiorly located valve to the outer terminal of the inlet is open for accumulation of water therein, in view of the fact that the portion of the turbine having the auxiliary inlet formed therein is continually surrounded with water. When the water head on a turbine is normal, the auxiliary inlet is not used and may remain in disuse for sometime, or until it is found necessary to increase or augment the suction in the draft-tube. At intervals when the auxiliary inlet 12 is closed, the water accumulating in those structures having the valve located at the inner terminal of the inlet deposits sediment in the inlet and the latter in time, or depending upon the period of disuse, may become materially clogged and the efficiency thereof as an inlet be greatly impaired. By the structure herein disclosed, this disadvantage, or the accumulation of sediment in the inlet, is obviated and the water that may be drawn into the inlet when the outer valve 14 is closed by the action of the water discharged from the runner 6 will immediately flow out, particularly in view of the downward inclination and direction of the walls of the inlet 12. The inlet may be entirely surrounded by water in free form, or, as shown by Fig. 7, the water may be confined in a pipe which in a like manner serves as a water supply completely surrounding the outer termination of the inlet.

I claim as my invention:—

1. A turbine having a runner, means for admitting a motive fluid to the runner, a single draft tube, inlet means associated with the draft tube and having inwardly inclined passages in a portion thereof for the admission of a supplemental fluid into the draft tube in the direction of flow of the motive fluid from the runner through said tube to increase the suction in the latter and the head on the runner, and valve means located and operable exteriorly of the inlet means to regulate admission of the supplemental fluid.

2. A turbine having a runner, means for admitting a motive fluid to the runner, a single draft tube, inlet means comprising a ring associated with the draft tube and provided with a supplemental fluid supply means to increase the suction in the draft tube and the head on the runner, and valve means shiftably mounted on the exterior of said ring to control the said supplemental fluid supply.

3. A turbine having a runner, means for admitting a motive fluid to the runner, a single draft tube associated with the runner and having a ring fixed thereto and provided with an inlet passage therethrough to admit a supplemental fluid into the tube beyond the runner to increase the suction in the tube and the head of the motive fluid on the runner, and a cylindrical valve gate surrounding the exterior of the ring over the inlet of the passage and provided with means for shifting the same to open and close the said passage.

4. The combination with a single draft tube, of a ring secured to the inlet end of the tube and having an inlet passage therethrough around the same, and valve means shiftably mounted on and cooperating with the outer side of said ring and outer terminal of the inlet passage.

5. A hydraulic turbine comprising a runner, means for controlling supply of water to the runner, a draft-tube into which the runner discharges having an auxiliary water inlet communicating therewith below the runner, the inlet being surrounded at the exterior portion thereof by water supply, and valve means located exteriorly of the inlet and operable to regulate the flow of water into and through the inlet, the inlet being free of water when the valve means is closed.

6. A hydraulic turbine comprising a runner, means for controlling supply of water to the runner, a draft-tube into which the runner discharges having an auxiliary water inlet communicating therewith below the runner, valve means cooperating with the exterior portion of the inlet to regulate the flow of water into and through the inlet, the inner termination of the inlet being continually open and permitting all water to flow outwardly therefrom when the exterior valve means is closed.

7. A hydraulic turbine comprising a runner, means for controlling supply of water to the runner, a draft-tube into which the runner discharges having an auxiliary water inlet communicating therewith below the runner and continually open from the inner to the outer terminations of the same and having a water supply surrounding the outer termination thereof, and valve means located exteriorly of the said auxiliary inlet and operable outside of the adjacent turbine structure to regulate the flow of water into the outer termination of and through said inlet.

8. A hydraulic turbine comprising a runner, means for controlling supply of water to the runner, a draft-tube having a downwardly inclined inlet continually open from the lower inner termination to the outer elevated termination thereof for the admission of auxiliary water to the draft-tube to increase the suction in the latter and the head on the runner, and valve means movable closely against the outer termination of said inlet to regulate the flow of water into said outer termination of and through the said inlet, the inner lower termination of the inlet being continually open to effect a complete drain of the inlet when the valve means is closed against the outer termination of the inlet.

In testimony whereof I have hereunto set my hand in presence of two subscribing witnesses.

JOHN H. FELTHOUSEN.

Witnesses:
CHAS. S. HYER,
ALICE DUFFY.